(12) United States Patent
DePue et al.

(10) Patent No.: US 7,427,981 B2
(45) Date of Patent: Sep. 23, 2008

(54) OPTICAL DEVICE THAT MEASURES DISTANCE BETWEEN THE DEVICE AND A SURFACE

(75) Inventors: Marshall Thomas DePue, San Mateo, CA (US); Dale W. Schroeder, Scotts Valley, CA (US); Tong Xie, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 689 days.

(21) Appl. No.: 10/826,799

(22) Filed: Apr. 15, 2004

(65) Prior Publication Data

US 2005/0231465 A1    Oct. 20, 2005

(51) Int. Cl.
*G06F 3/33* (2006.01)
(52) U.S. Cl. ............... 345/166; 345/156; 345/163
(58) Field of Classification Search ......... 345/156–179
See application file for complete search history.

(56) References Cited

U.S. PATENT DOCUMENTS

| | | | |
|---|---|---|---|
| 6,188,482 B1 | 2/2001 | Cloud | |
| 6,657,184 B2 * | 12/2003 | Anderson et al. | 345/166 |
| 6,934,037 B2 * | 8/2005 | DePue et al. | 356/498 |
| 7,116,427 B2 * | 10/2006 | Baney et al. | 345/166 |
| 7,161,582 B2 * | 1/2007 | Bathiche et al. | 345/156 |
| 2005/0024624 A1 * | 2/2005 | Gruhlke et al. | 356/3.01 |
| 2005/0035947 A1 * | 2/2005 | Lutian | 345/166 |
| 2005/0073693 A1 * | 4/2005 | DePue et al. | 356/499 |
| 2005/0190157 A1 * | 9/2005 | Oliver et al. | 345/166 |
| 2005/0231482 A1 * | 10/2005 | Theytaz et al. | 345/166 |

FOREIGN PATENT DOCUMENTS

EP    0 024 167 A2    8/1980

\* cited by examiner

*Primary Examiner*—David L Lewis (57) ABSTRACT

An optical device and methods thereof are described. The device includes a first light source adapted to emit light onto a surface, and a detector adapted to receive light reflected from the surface. The reflected light produces a speckle pattern. The distance between the optical device and the surface can be measured using a quantifiable attribute associated with the speckle pattern.

20 Claims, 4 Drawing Sheets

DETECT A 1st SPECKLE PATTERN PRODUCED BY LIGHT AT A 1st WAVELENGTH THAT IS REFLECTED FROM A SURFACE AT A 1st DISTANCE TO THE SURFACE
72

↓

DETECT A 2nd SPECKLE PATTERN PRODUCED BY LIGHT AT A 2nd WAVELENGTH THAT IS REFLECTED FROM THE SURFACE AT A 2nd DISTANCE TO THE SURFACE, WHEREIN THE 1st AND 2nd WAVELENGTHS ARE SELECTED SO THAT A MEASURE OF THE 1st SPECKLE PATTERN AND A MEASURE OF THE 2nd SPECKLE PATTERN ARE APPROXIMATELY EQUAL
74

↓

MEASURE DISTANCE TO THE SURFACE USING THE RATIO OF THE 1st AND 2nd WAVELENGTHS
76

DETECT A 1st SPECKLE PATTERN PRODUCED BY REFLECTED LIGHT AT A 1st WAVELENGTH
82

↓

DETECT A 2nd SPECKLE PATTERN PRODUCED BY REFLECTED LIGHT AT A 2nd WAVELENGTH
84

↓

MEASURE DISTANCE BETWEEN AN OPTICAL DEVICE AND A SURFACE USING QUANTIFIABLE VALUES ASSOCIATED WITH THE 1st AND 2nd SPECKLE PATTERNS
86

OPTICAL DEVICE THAT MEASURES DISTANCE BETWEEN THE DEVICE AND A SURFACE

BACKGROUND ART

Optical navigation devices conventionally use a laser-generated light that reflects off a surface to a detector. The detector includes, for example, a complementary metal-oxide semiconductor (CMOS) imager array. The reflection of the light produces a pattern of speckle that is captured by the CMOS imager. As the device is moved relative to the surface (or vice versa), successive images are rapidly captured and compared to determine the amount of movement. The rate at which images are captured can be used to determine the velocity of movement.

Optical navigation devices generally perform well for tracking two-dimensional movements. For example, an optical mouse very precisely tracks movement along the surface of a mouse pad. However, optical navigation can be problematic in certain applications that involve three-dimensional movements.

Consider, for example, an optical pen that is being used to translate and display a user's handwritten input. As the user "writes" with the optical pen, the characters formed by the user are displayed. The user may need to move backward into what has already been written and displayed, to dot an "i" for example. However, movement of the optical pen back to the location of the "i" is tracked and displayed. In other words, when the optical pen is lifted and moved, the movement of the optical pen continues to be tracked and a trace of the movement is incorporated into the display. As such, movements of the optical pen not intended to be seen are nevertheless visible.

Accordingly, an optical navigation device that performs well in three dimensions would be valuable.

DISCLOSURE OF THE INVENTION

Embodiments in accordance with the invention pertain to an optical device and methods thereof. The device includes a first light source adapted to emit light onto a surface, and a detector adapted to receive light reflected from the surface. The reflected light produces a speckle pattern. The distance between the optical device and the surface can be measured using a quantifiable attribute associated with the speckle pattern. The detector can also track transverse movement relative to the surface. Thus, embodiments in accordance with the invention provide optical navigation in three dimensions.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should not be understood as being drawn to scale except if specifically noted.

DETAILED DESCRIPTION OF THE INVENTION

Reference will now be made in detail to various embodiments in accordance with the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. In other instances, well known methods, procedures, components, and circuits have not been described in detail as not to unnecessarily obscure aspects of the invention.

Figure 1:
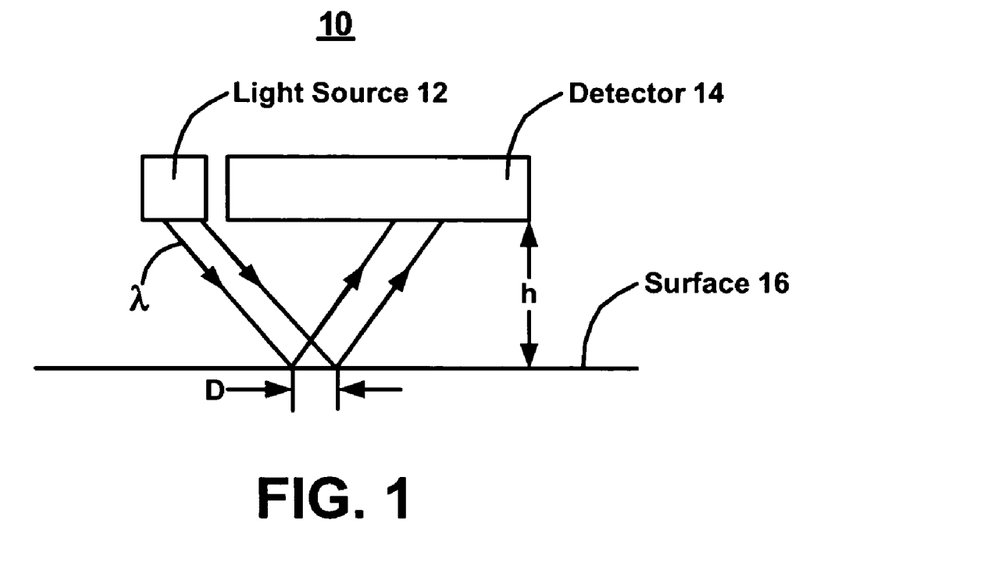
FIG. 1 is a block diagram showing elements of one embodiment of an optical device in accordance with the invention.

FIG. 1 is a block diagram showing elements of an optical device 10 in one embodiment in accordance with the invention. Optical device 10 can be an optical mouse or an optical pen that may be used with a computer system, for example.

In the embodiment of FIG. 1, optical device 10 includes a light source 12 and a detector 14. Device 10 can include other elements in addition to those described or illustrated herein, such as but not limited to circuitry and other electronics associated with the light source 12 and the detector 14, processing capability for processing image data and for other processing functions, and storage capability for storing image data or images as well as other information.

Detector 14 can utilize, for example, a charge-coupled device (CCD) imager array or a complementary metal-oxide semiconductor (CMOS) imager array. Light source 12 can utilize a coherent light source such as a laser. Alternatively, light source 12 can utilize a narrow-band light-emitting diode (LED) or an LED with an optical filter. In one embodiment, light source 12 emits light at a fixed wavelength. In another embodiment, light source 12 emits light over a range of wavelengths. In the latter embodiment, light source 12 has the capability of dynamically changing from one wavelength to another wavelength.

In operation, light from light source 12 is reflected from surface 16 to detector 14. Surface 16 can be virtually any kind of surface that can reflect light in this manner. Surface 16 may be, for example, a mouse pad or similar type of surface. Surface 16 may also be, for example, the display screen of a computer system. In general, surface 16 is representative of virtually any surface except optically flat surfaces.

In the example of FIG. 1, light source 12 emits light having wavelength λ (as mentioned above, the wavelength may be fixed or it may be changeable). The length of the spot on surface 16 that is illuminated by light source 12 is given by D. The distance between detector 14 and the surface 16 is given by h.

Light from light source 12 that is reflected from surface 16 will produce a speckle pattern that is captured by detector 14. The speckle pattern typically includes a number of individual speckles spatially distributed with a known statistical distribution. Various statistical measures can be calculated to describe the speckle pattern. A statistical measure commonly used is the average size of the speckles in the speckle pattern. The average transverse speckle ($d_{ave}$) size is related to $\lambda$, D and h by equation (1):

$$d_{ave} = \lambda\left(\frac{h}{D}\right). \quad (1)$$

Figure 2:
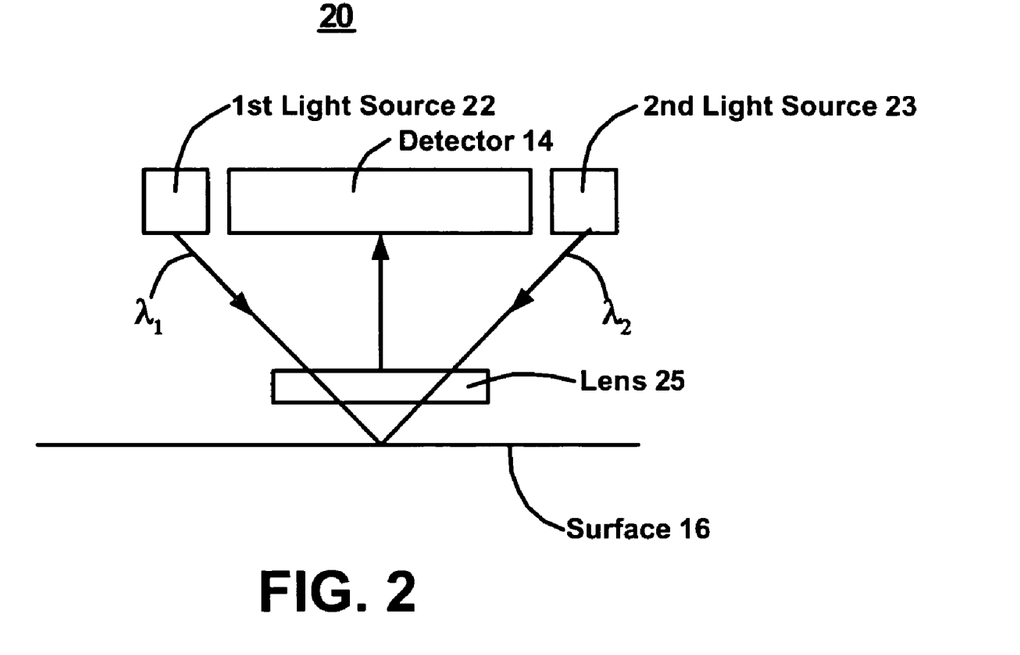
FIG. 2 is a block diagram showing elements of another embodiment of an optical device in accordance with the invention.

FIG. 2 is a block diagram showing elements of an optical device 20 in another embodiment in accordance with the invention. Optical device 20 can be an optical mouse or an optical pen that may be used with a computer system, for example. In the embodiment of FIG. 2, optical device 20 includes first light source 22, second light source 23, and detector 14. Device 20 can include other elements in addition to those described or illustrated herein.

Detector 14 can utilize, for example, a CCD imager array or a CMOS imager array. Light sources 22 and 23 can each utilize a coherent light source such as a laser, a narrow-band LED, or an LED with an optical filter. In one embodiment, light sources 22 and 23 emit light at fixed wavelengths. In another embodiment, light sources 22 and 23 emit light over a range of wavelengths, with the capability of dynamically changing from one wavelength to another wavelength. In the example of FIG. 2, light source 22 emits light having wavelength $\lambda_1$ and light source 23 emits light having wavelength $\lambda_2$. The wavelengths $\lambda_1$ and $\lambda_2$ can be different from each other, or they can be the same, depending on how optical device 20 is used in operation.

In operation, light from light sources 22 and 23 is directed to the same spot on surface 16 and reflected from surface 16 to detector 14. In one embodiment, a lens 25 is used to direct the light reflected from surface 16 to detector 14.

Figure 3:
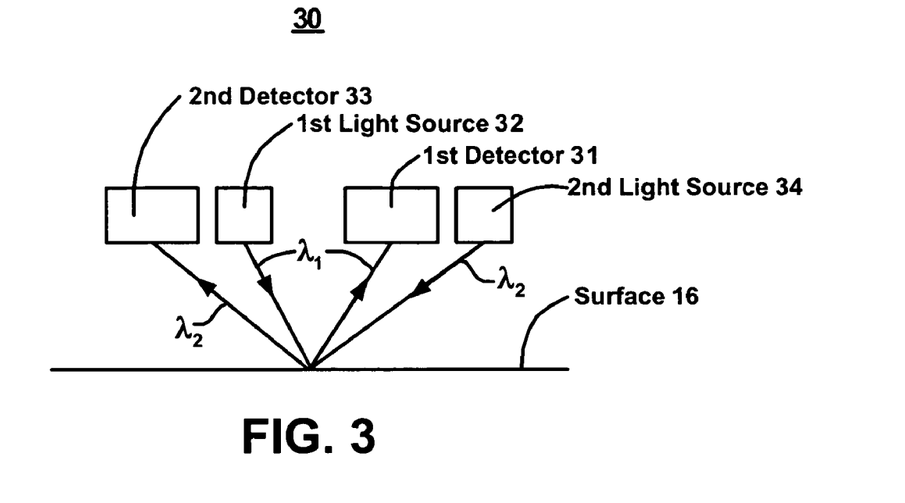
FIG. 3 is a block diagram showing elements of yet another embodiment of an optical device in accordance with the invention.

FIG. 3 is a block diagram showing elements of an optical device 30 in yet another embodiment in accordance with the invention. Optical device 30 can be an optical mouse or an optical pen that may be used with a computer system, for example. In the embodiment of FIG. 3, optical device 30 includes first light source 32, second light source 34, first detector 31 and second detector 33. Device 30 can include other elements in addition to those described or illustrated herein.

Detectors 31 and 33 can each utilize, for example, a CCD imager array or a CMOS imager array. Light sources 32 and 34 can each utilize a coherent light source such as a laser, a narrow-band LED, or an LED with an optical filter. In the example of FIG. 3, light source 32 emits light having wavelength $\lambda_1$ and light source 34 emits light having wavelength $\lambda_2$.

In one embodiment, light sources 32 and 34 emit light at fixed wavelengths. In another embodiment, light sources 32 and 34 emit light over a range of wavelengths, with the capability of dynamically changing from one wavelength to another wavelength. In either case, the wavelengths may be the same or different from each other, depending on how optical device 30 is used in operation. When different, the wavelengths used by light sources 32 and 34 may be close to each or far apart. Detectors 31 and 33 can use different technologies depending on the wavelengths used by light sources 32 and 34. In other words, one type of detector technology may be better suited to a particular wavelength than another. If, for example, the wavelengths are far apart, one type detector technology can be used with one wavelength and another type of detector technology can be used with the other wavelength.

In operation, light from light sources 32 and 34 is directed to the same spot on surface 16. Light from light source 32 is reflected from surface 16 to detector 31, and light from light source 34 is reflected from surface 16 to detector 33.

Figure 4:
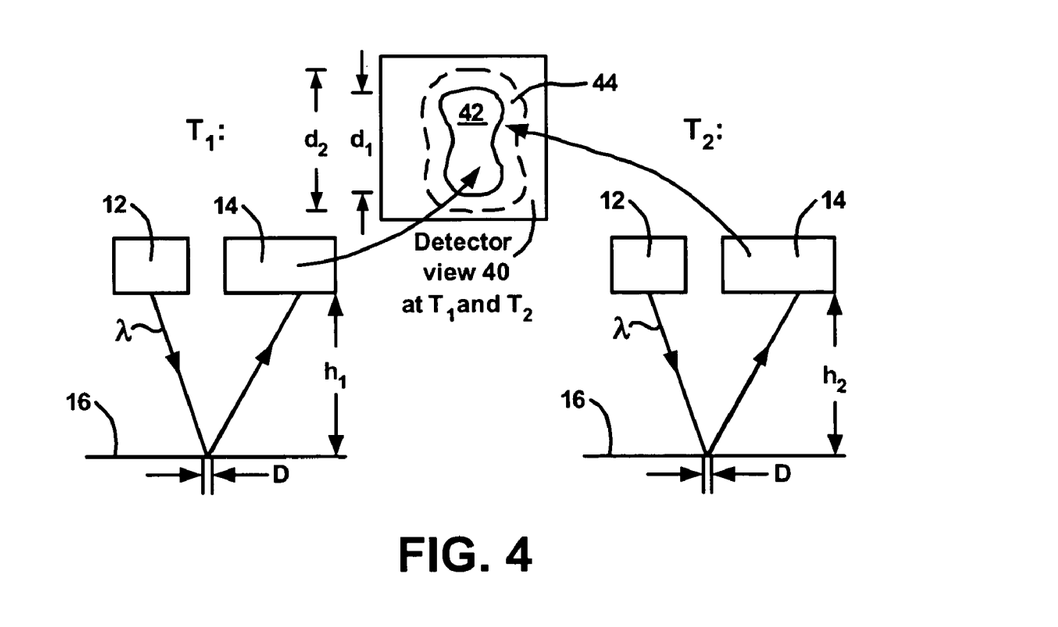
FIG. 4 illustrates an optical device in operation in one embodiment in accordance with the invention.

FIG. 4 illustrates an optical device in operation in one embodiment in accordance with the invention. The optical device of FIG. 4 can use either a single light source, as exemplified by optical device 10 of FIG. 1, or multiple light sources, as exemplified by optical devices 20 and 30 of FIGS. 2 and 3. In the latter case, in one embodiment, the multiple light sources emit light of the same or substantially the same wavelength.

For the purposes of the present application, the term "substantially the same wavelength" is defined as follows. In the embodiment of FIG. 4, a change in the distance between the optical device and the surface 16 is identified by comparing a quantifiable attribute associated with the speckle pattern at a time $T_1$ with a quantifiable attribute associated with the speckle pattern at a time $T_2$. In one embodiment, the average speckle size at time $T_1$ is compared with the average speckle size at time $T_2$ (as discussed below, other quantifiable attributes other than average speckle size may be used). The average speckle size is influenced not only by the distance between the optical device and the surface, but by the wavelength of light. The wavelengths from different light sources need to be similar enough so that a change in average speckle size from one time to the next can be attributed to a change in distance and not to a difference in wavelength. Ideally, the wavelengths from the different light sources would be identical. There is no distinct cutoff for an acceptable difference in wavelengths between multiple light sources; however, the closer the wavelengths of the two light sources are to each other, the better.

For simplicity of discussion and illustration, the example of FIG. 4 is described using optical device 10 of FIG. 1. As will be seen, this example can then be extended to cover the use of optical device 20 and 30 of FIGS. 2 and 3, respectively.

At time $T_1$, detector 14 is a distance $h_1$ from surface 16. At time $T_2$, detector 14 is a distance $h_2$ from surface 16. The speckle patterns at times $T_1$ and $T_2$ will each include a number of speckles of different sizes, shapes and distributions. In the present embodiment, the speckle patterns at times $T_1$ and $T_2$ are each represented by a respective average transverse speckle size $d_1$ and $d_2$. The average transverse speckle size $d_1$ at time $T_1$ is illustrated as element 42 in detector view 40. The average transverse speckle size $d_2$ at time $T_2$ is illustrated as element 44 in detector view 40.

By applying equation (1) in the example of FIG. 4, with $\lambda_1=\lambda_2$ and for constant D, it can be shown that:

$$\frac{d_1}{d_2} = \frac{h_1}{h_2}. \quad (2)$$

Equation (2) can be applied in a number of different ways. In one application, a change in distance is detected when there is a change in average transverse speckle size over time. Thus, by detecting a change in average speckle size over time (e.g., over successive image frames), it is possible to identify that the optical device has been lifted from a surface that the device was previously in contact with, and it is also possible to identify that the optical device has been moved further away from or closer to a surface.

In another application, the magnitude of a change in distance between the optical device (e.g., detector 14) and the surface 16, or the distance between the optical device and the surface, can be determined. For example, with the optical device directly in contact with surface 16 at time $T_1$, then $d_1$ is equal to $d_2$ and $h_1$ is equal to $h_2$. Values of $d_1$ and $h_1$ can be retained in some manner. For example, they can be stored in a memory associated with the detector 14. At time $T_2$, with the optical device moved to a distance $h_2$, the average speckle size $d_2$ is determined. Using the values of $h_1$, $d_1$ and $d_2$ in equation (2), a value for $h_2$ can be determined. The magnitude of the change from time $T_1$ to time $T_2$ (e.g., $h_2$ minus $h_1$) can be determined, or the actual distance to the surface at time $T_2$ (e.g., $h_2$) can be determined. The values of $d_2$ and $h_2$ can then be retained, and used in a manner similar to that just described to determine the distance or change in distance between the optical device and the surface at a later time (e.g., after the next time increment), and so on.

Optical devices such as those described herein operate at frame rates of 1500 frames per second or more. Accordingly, the time difference between time $T_1$ and time $T_2$ can be very small. Also, imager arrays used in optical devices have very high resolutions that continue to improve. As such, relatively small changes in average speckle size can be measured, and therefore relatively small changes in distance can be detected.

The example of FIG. 4 can be extended to optical devices 20 and 30 of FIGS. 2 and 3, respectively. For optical device 20, which includes two light sources 22 and 23 and a single detector 14, the two light sources are adjusted so that they emit light of the same or substantially the same wavelength (e.g., $\lambda_1 = \lambda_2$), and the detector functions as described above. For optical device 30, which includes two light sources 32 and 34 and two detectors 31 and 33, the two light sources are adjusted so that they emit light of the same or substantially the same wavelength (e.g., $\lambda_1 = \lambda_2$), and one detector can be used to collect a speckle pattern at time $T_1$ and the other detector can be used to collect a speckle pattern at time $T_2$.

Figure 5:
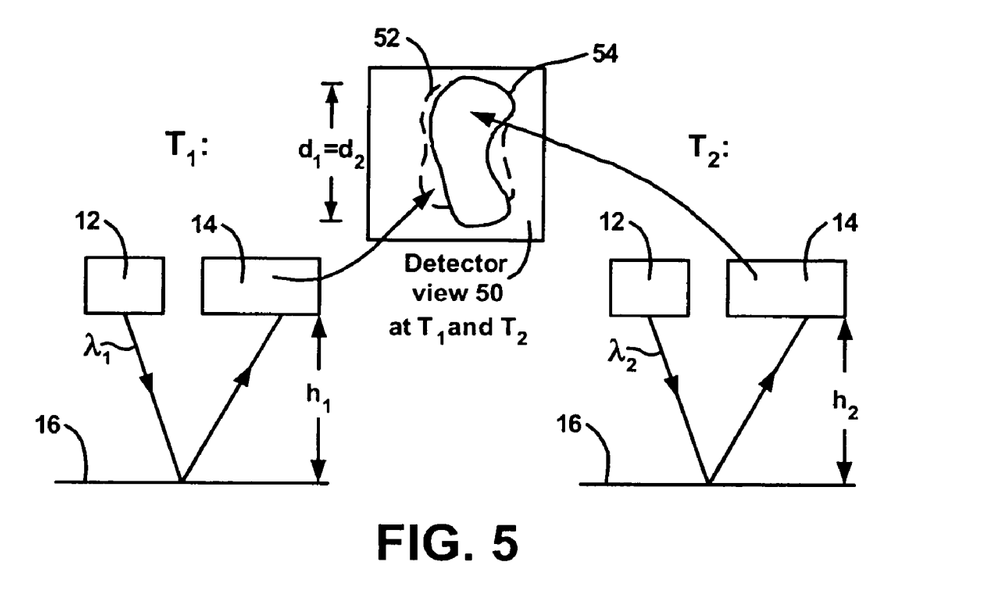
FIG. 5 illustrates an optical device in operation in another embodiment in accordance with the invention.

FIG. 5 illustrates an optical device in operation in another embodiment in accordance with the invention. The optical device of FIG. 5 can use either a single light source as exemplified by light source 12 of optical device 10 (FIG. 1), or multiple light sources as exemplified by light sources 22 and 23 of optical device 20 (FIG. 2) and light sources 32 and 34 of FIG. 3.

With a single light source 12, at time $T_1$ the light source 12 of FIG. 1 emits light having a wavelength $\lambda_1$, and at time $T_2$ the light source 12 emits light having a wavelength $\lambda_2$. In other words, the wavelength of the light from light source 12 is allowed to dynamically change as the optical device is moved toward or away from the surface 16. In particular, the wavelength is automatically adjusted so that the average speckle size $d_2$ at time $T_2$ is the same (or approximately the same) as the average speckle size $d_1$ at time $T_1$.

With multiple light sources, in one embodiment, one of the light sources is used at time $T_1$ and the other light source is used at time $T_2$. Even with multiple light sources, it may be desirable to dynamically change the wavelength of one or both of the light sources as the optical device is moved toward or away from the surface 16. In other words, as the optical device is moved closer to or further from the surface, both wavelengths can be adjusted from time $T_1$ to time $T_2$, or one of the wavelengths can be adjusted while the other wavelength is held essentially constant.

For the purposes of the present application, the term "essentially constant" when applied to wavelengths is defined as follows. The wavelength of one light source is not adjusted; however, there may be some variance in wavelength due to fluctuations normally associated with the operation of the light source. For example, slight fluctuations in power may result in variations in wavelength. Note that a situation in which the variation in wavelength is other than "essentially constant" is covered by the alternate embodiment in which both wavelengths are adjusted.

For simplicity of discussion and illustration, the example of FIG. 5 is described using optical device 10 of FIG. 1. As will be seen, this example can then be extended to cover the use of optical device 20 and 30 of FIGS. 2 and 3, respectively.

At time $T_1$, detector 14 is a distance $h_1$ from surface 16. At time $T_2$, detector 14 is a distance $h_2$ from surface 16. In the present embodiment, the wavelength of light source 12 is adjusted so that a relatively constant average speckle size is maintained over time (e.g., from time $T_1$ to time $T_2$ and at each subsequent time). The average transverse speckle size $d_1$ at time $T_1$ is illustrated as element 52 in detector view 50, and the average transverse speckle size $d_2$ time $T_2$ is illustrated as element 54 in detector view 50. In actuality, the speckle patterns at times $T_1$ and $T_2$ will each include a number of speckles of different sizes, shapes and distributions. Although the speckle patterns may be different at times $T_1$ and $T_2$, the average speckle size $d_{ave} = d_1 = d_2$ is held constant or essentially constant over time.

For the purposes of the present application, the term "essentially constant" when applied to average transverse speckle size is defined as follows. In the embodiment of FIG. 5, a change in the distance between the optical device and the surface 16 is identified by rationing the wavelength of light source 12 at time $T_1$ and the wavelength of light source 12 at time $T_2$. The degree to which a constant average transverse speckle size can be maintained has an influence on how accurately a change in distance can be measured. The average transverse speckle sizes at times $T_1$ and $T_2$ need to be similar enough so that a change in wavelength from one time to the next can be attributed to a change in distance and not to a difference in average transverse speckle size. Ideally, the average transverse speckle size at times $T_1$ and $T_2$ would be identical. There is no distinct cutoff for an acceptable difference in average transverse speckle size at times $T_1$ and $T_2$; however, the closer the average transverse speckle size at times $T_1$ and $T_2$ are to each other, the better.

By applying equation (1) in the example of FIG. 5, with $d_1 = d_2$, it can be shown that:

$$\frac{\lambda_1}{\lambda_2} = \frac{h_2}{h_1}. \tag{3}$$

Equation (3) can be applied in a number of different ways. In one application, a change in distance is detected when there is a change in wavelength over time. Wavelengths can be determined from the wavelength tuning characteristics of the light source(s). Thus, by detecting a change in wavelength over time (e.g., over successive image frames), it is possible to identify that the optical device has been lifted from a surface that the device was previously in contact with, and it is also possible to identify that the optical device has been moved further away from or closer to a surface.

In another application, the magnitude of a change in distance between the optical device (e.g., detector 14) and the surface 16, or the distance between the optical device and the surface, can be determined. Consider an example in which there is a single light source. With the optical device directly in contact with surface 16 at time $T_1$, then $\lambda_1$ is equal to $\lambda_2$ and $h_1$ is equal to $h_2$. Values of $\lambda_1$ and $h_1$ can be retained in some manner. For example, they can be stored in a memory associated with the detector. At time $T_2$, with the optical device moved to a distance $h_2$, the wavelength is adjusted to a second value ($\lambda_2$). The second value is selected so that the average speckle size remains the constant or essentially constant over time. Using the values of $h_1$, $\lambda_1$ and $\lambda_2$ in equation (3), a value for $h_2$ can be determined. The magnitude of the change from $T_1$ to $T_2$ (e.g., $h_2$ minus $h_1$) can be determined, or the actual distance to the surface at time $T_2$ (e.g., $h_2$) can be determined. The values of $\lambda_2$ and $h_2$ can then be retained, and used in a manner similar to that just described to determine the distance or change in distance between the optical device and the surface at a later time (e.g., after the next time increment), and so on.

The example of FIG. 5 describes an application in which the wavelength is changed from $\lambda_1$ to $\lambda_2$ over time using a single light source. The example of FIG. 5 can be extended to optical devices 20 and 30 of FIGS. 2 and 3, respectively, which each utilize two light sources. With two light sources, the wavelength at one of the light sources (e.g., $\lambda_1$) can be held at a constant or nearly constant value, while the wavelength of the second light source (e.g., $\lambda_2$) is adjusted in a manner that achieves a constant or essentially constant average transverse speckle size over time. The ratio of $\lambda_1$ and $\lambda_2$, alone with $h_1$, can be used as described above to determine $h_2$. Alternatively, from time $T_1$ to time $T_2$, the wavelength of the first light source can be held constant while the wavelength of the second light source is adjusted, and then from time $T_2$ to the next measurement (e.g., at time $T_3$), these roles can be reversed (with the wavelength of the second light source held constant while the wavelength of the first light source is adjusted). It is also possible that, with two light sources and suitable processing, both wavelengths can be adjusted over time. For optical device 30, which includes two detectors 31 and 33, one detector can be used to collect a speckle pattern at time $T_1$ and the other detector can be used to collect a speckle pattern at time $T_2$.

Figure 6:
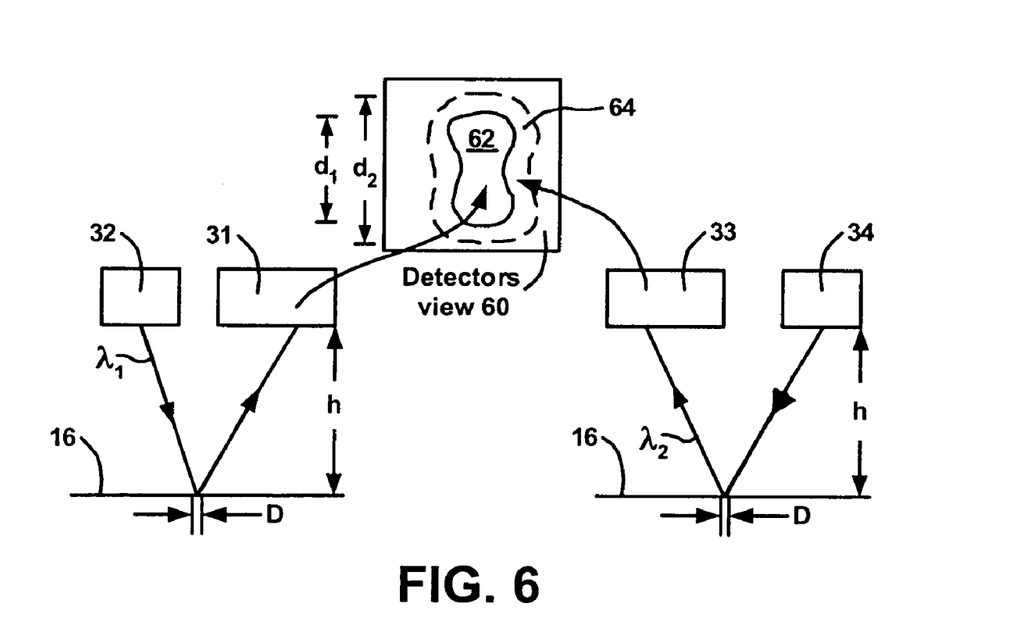
FIG. 6 illustrates an optical device in operation in yet another embodiment in accordance with the invention.

FIG. 6 illustrates an optical device in operation in yet another embodiment in accordance with the invention. The optical device of FIG. 6 utilizes two light sources and two detectors as exemplified by optical device 30 of FIG. 3. In the example of FIG. 6, the wavelengths associated with the two light sources are different from each other.

Both detectors 31 and 33 are at a distance h from surface 16. At the same time, both light sources 32 and 34 illuminate the same spot on surface 16 (note that this is in contrast to the examples of FIGS. 4 and 5, in which consecutive measurements are made at times $T_1$ and $T_2$). Light source 32 emits light at a wavelength $\lambda_1$ and light source 34 emits light at a wavelength $\lambda_2$. Two different speckle patterns are generated as a result. The average transverse speckle size $d_1$ associated with light source 32 and detector 31 is illustrated as element 62 in FIG. 6. The average transverse speckle size $d_2$ associated with light source 34 and detector 33 is illustrated as element 64 in FIG. 6. Although two different detectors are used, the average speckle sizes are overlaid in a single view to highlight that there is a difference between the average transverse speckle sizes $d_1$ and $d_2$.

By applying equation (1) in the example of FIG. 6, it can be shown that:

$$d_1 - d_2 = (\lambda_1 - \lambda_2) * h/D; \text{ or} \tag{4}$$

$$h = D*(d_1 - d_2)/(\lambda_1 - \lambda_2). \tag{5}$$

Thus, by applying equation (5), the distance between the optical device and the surface can be determined. Equation (5) is advantageous because it removes from the distance calculation any terms that depend on the type of surface 16 (e.g., paper versus wood) or on the local properties of surface 16 (e.g., whether the spot being illuminated is scratched or exhibits some other type of non-uniformity).

Figure 7:
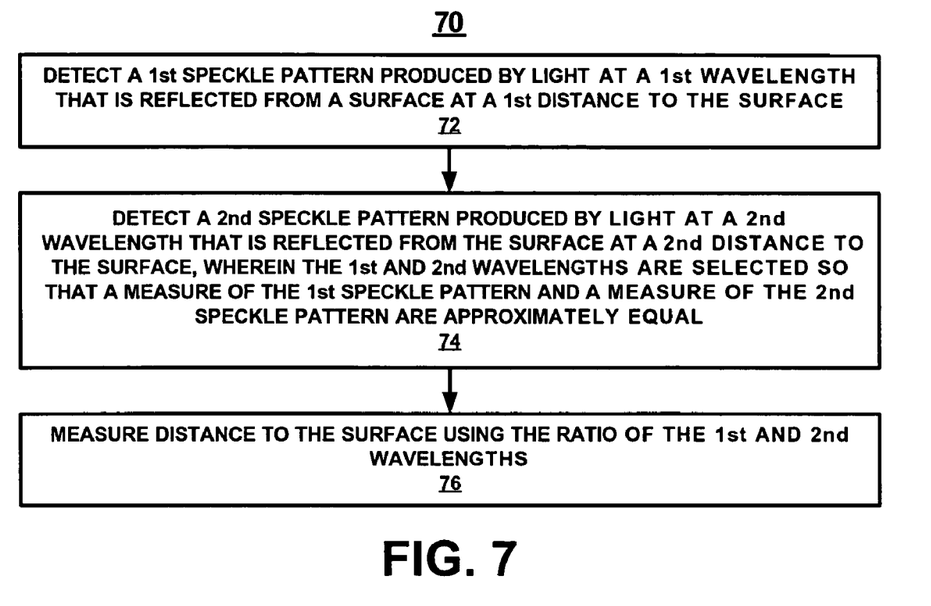
FIG. 7 is a flowchart of one embodiment of a method of optical navigation in accordance with the invention.

FIG. 7 is a flowchart 70 of one embodiment of a method of optical navigation in accordance with the invention. Although specific steps are disclosed in flowchart 70, such steps are exemplary. That is, embodiments in accordance with the invention are well suited to performing various other steps or variations of the steps recited in flowchart 70. It is appreciated that the steps in flowchart 70 may be performed in an order different than presented, and that not all of the steps in flowchart 70 may be performed. The method of flowchart 70 is implemented according to the embodiment described above in conjunction with FIG. 5.

In step 72 of FIG. 7, with the optical device at a first distance from a surface, light is provided at a first wavelength. Light reflected from the surface at the first distance and at the first wavelength produces a first speckle pattern that can be detected.

In step 74, with the optical device at a second distance from the surface, light is provided at a second wavelength. Light reflected from the surface at the second distance and at the second wavelength produces a second speckle pattern that can be detected. The first and second wavelengths are selected such that a quantifiable value associated with the second speckle pattern (e.g., the average speckle size of the second speckle pattern) is approximately equal to a quantifiable value associated with the first speckle pattern (e.g., the average speckle size of the first speckle pattern).

In step 76, the distance between the optical device and the surface is measured using the ratio of the first and second wavelengths.

Figure 8:
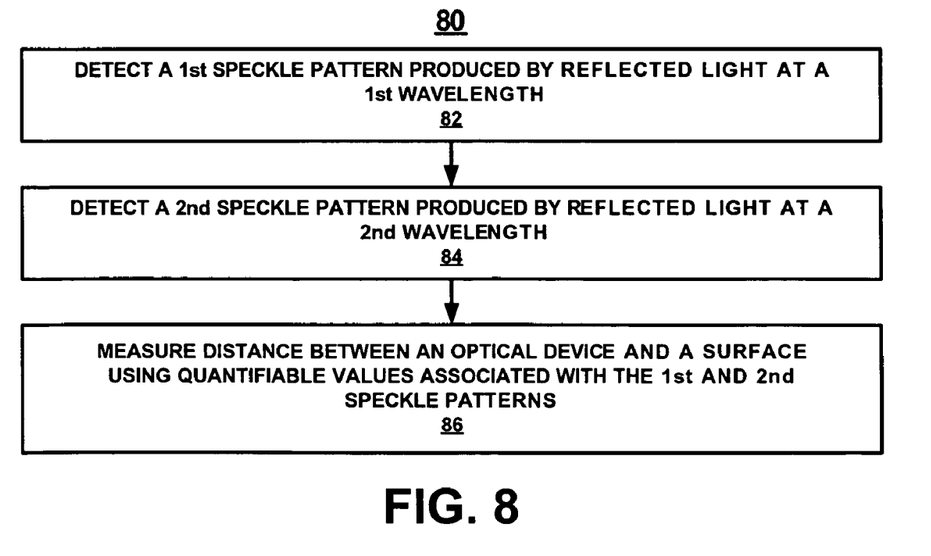
FIG. 8 is a flowchart of another embodiment of a method of optical navigation in accordance with the invention.

FIG. 8 is a flowchart 80 of another embodiment of a method of optical navigation in accordance with the invention. Although specific steps are disclosed in flowchart 80, such steps are exemplary. That is, embodiments in accordance with the invention are well suited to performing various other steps or variations of the steps recited in flowchart 80. It is appreciated that the steps in flowchart 80 may be performed in an order different than presented, and that not all of the steps in flowchart 80 may be performed. The method of flowchart 80 is implemented according to the embodiment described above in conjunction with FIGS. 4 and 6.

In step 82 of FIG. 8, light at a first wavelength is reflected from a surface. The reflected light at the first wavelength produces a first speckle pattern that can be detected.

In step 84, light at a second wavelength is reflected from the surface. The reflected light at the second wavelength produces a second speckle pattern that can be detected. Depending on how the optical device is being operated, the first and second wavelengths may be substantially the same, or they may be different from each other.

In step 86, for the case in which the first and second wavelengths are substantially the same, the distance between the optical device and the surface is measured using the ratio of a quantifiable value associated with the first speckle pattern and a quantifiable value associated with the second speckle pattern (e.g., the respective average speckle size of the first and second speckle patterns). For the case in which the first and second wavelengths are different from each other, the distance between the optical device and the surface is measured using the difference between a quantifiable value associated with the first speckle pattern and a quantifiable value associated with the second speckle pattern (e.g., the respective average speckle size of the first and second speckle patterns) and also using the difference between the two wavelengths.

In summary, a change in distance between an optical device and a surface can be detected. In addition, the magnitude of the change in distance, or the distance between the optical device and the surface (e.g., the height of the device), can be determined. The height can be used to adjust the gain of two-dimensional navigation at each different height. The height can be used to distinguish, for example, scrolling of a display versus two-dimensional navigation of the display, to select cascaded windows in a display, to navigate three-dimensional displays, and/or to select cascaded menus from a display.

In addition to determining distance to and from a surface, embodiments of the optical device described herein can also detect transverse movement of the device relative to the surface by comparing successive images of speckle patterns, for example. Therefore, embodiments in accordance with the invention provide an optical device that functions in three dimensions.

Although described for detectors that use CCD or CMOS imager arrays, embodiments in accordance with the invention are not so limited. As an example of an alternative implementation, a detector can use a linear array of one or more pixels. As such a detector is moved further away from a surface, for example, the size of each speckle will get larger. Consequently, more of the area of the detector will be covered by the speckle(s). This will change the relative contrast or brightness detected by the detector; that is, with larger speckles, more of the surface of the detector would be illuminated, and so the detector would detect more brightness as it is moved further from the surface. The opposite would be true as the detector is moved closer to the surface. The distance between the optical device and the surface can be calibrated to the amount of brightness or contrast detected by the detector. Thus, in this alternative approach, the average transverse speckle size does not have to be measured.

Moreover, embodiments in accordance with the invention do not rely on image correlation techniques (e.g., techniques that depend on a comparison of speckle patterns or average speckle sizes at different times or for different wavelengths). As an example of an alternative approach, the number of speckles can be counted and used instead of average speckle size. Accordingly, embodiments in accordance with the invention can be implemented using devices that are smaller than those devices that utilize image correlation techniques.

The invention is thus described in various embodiments. While the invention has been described in particular embodiments, it should be appreciated that the present invention should not be construed as limited by such embodiments, but rather construed according to the following claims.

What is claimed is:

1. An optical device comprising:
a first light source that emits first light onto a surface;
a first detector that receives light reflected from said surface, wherein reflected light produces a first speckle pattern at said first detector with said optical device and said surface separated by a first distance;
wherein reflected light produces a second speckle pattern at said first detector with said optical device and said surface separated by a second distance; and
wherein said first light is adjusted from a first wavelength at said first distance to a second wavelength at said second distance so that a quantifiable attribute associated with said first speckle pattern and a quantifiable attribute associated with said second speckle pattern are approximately equal, wherein the ratio of said first and second wavelengths is used to measure distance between said optical device and said surface.

2. The optical device of claim 1 further comprising a second light source adapted to emit second light onto said surface, said first light comprising light at a first wavelength and said second light comprising light at a second wavelength that is different from said first wavelength, wherein said first speckle pattern is produced by reflected first light and said second speckle pattern is produced by reflected second light.

3. The optical device of claim 1 wherein said quantifiable attribute associated with said first speckle pattern corresponds to the average speckle size of said first speckle pattern.

4. The optical device of claim 1 wherein said quantifiable attribute associated with said first speckle pattern corresponds to the number of speckles in said first speckle pattern.

5. The optical device of claim 1 wherein said quantifiable attribute associated with said first speckle pattern corresponds to the amount of brightness measured by said first detector.

6. The optical device of claim 1 further adapted to detect transverse movement of said optical device relative to said surface.

7. A method of optical navigation using an optical device, said method comprising:
detecting at said optical device a first speckle pattern produced by light comprising light at a first wavelength reflecting from a surface with said optical device at a first distance from said surface;
detecting at said optical device a second speckle pattern produced by light comprising light at a second wavelength reflecting from said surface with said optical device at a second distance from said surface, wherein said first and second wavelengths are selected so that a first quantifiable value associated with said first speckle pattern and a second quantifiable value associated with said second speckle pattern are approximately equal; and
measuring distance between said optical device and said surface using the ratio of said first and second wavelengths.

8. The method of claim 7 wherein said light at said first wavelength and said light at said second wavelength are provided from a single light source, wherein the wavelength of light provided from said single light source is adjusted from said first wavelength to said second wavelength during movement of said optical device from said first distance to said second distance.

9. The method of claim 7 wherein said light at said first wavelength is provided by a first light source and said light at said second wavelength is provided by a second light source.

10. The method of claim 7 wherein said first and second quantifiable values correspond to the average speckle size of said first and second speckle patterns, respectively.

11. The method of claim 7 wherein said first and second quantifiable values correspond to the number of speckles in said first and second speckle patterns, respectively.

12. The method of claim 7 wherein said first and second quantifiable values correspond to the amount of brightness associated with said first and second speckle patterns, respectively.

13. In an optical device, a method of optical navigation, said method comprising:
detecting at said optical device a first speckle pattern produced by light comprising light at a first wavelength reflecting from a surface with said optical device at a first distance from said surface;
detecting at said optical device a second speckle pattern produced by light comprising light at a second wavelength reflecting from said surface with said optical device at a second distance from said surface;

adjusting said second wavelength relative to said first wavelength so that a first quantifiable value associated with said first speckle pattern and a second quantifiable value associated with said second speckle pattern are approximately equal; and measuring distance between said optical device and said surface using the ratio of said first and second wavelengths.

14. The method of claim 13 wherein said light at said first wavelength and said light at said second wavelength are emitted from a single light source.

15. The method of claim 13 wherein said light at said first wavelength is provided by a first light source and said light at said second wavelength is provided by a second light source.

16. The method of claim 13 wherein said optical device comprises a single detector for detecting said first and second speckle patterns.

17. The method of claim 13 wherein said optical device comprises a first detector for detecting said first speckle pattern and a second detector for detecting said second speckle pattern.

18. The method of claim 13 wherein said first and second quantifiable values correspond to the average speckle size of said first and second speckle patterns, respectively.

19. The method of claim 13 wherein said first and second quantifiable values correspond to the number of speckles in said first and second speckle patterns, respectively.

20. The method of claim 13 wherein said first and second quantifiable values correspond to the amount of brightness associated with said first and second speckle patterns, respectively.

* * * * *